United States Patent [19]

Uehara

[11] Patent Number: 5,008,874
[45] Date of Patent: Apr. 16, 1991

[54] RECORDING AND/OR REPRODUCING APPARATUS

[75] Inventor: Tsukasa Uehara, Tokyo, Japan

[73] Assignee: Canon Kabushiki Kaisha, Tokyo, Japan

[21] Appl. No.: 497,835

[22] Filed: Mar. 22, 1990

Related U.S. Application Data

[63] Continuation of Ser. No. 334,810, Apr. 6, 1989, abandoned, which is a continuation of Ser. No. 148,130, Jan. 26, 1988, abandoned, which is a continuation of Ser. No. 777,235, Sep. 18, 1985, abandoned.

[30] Foreign Application Priority Data

Sep. 19, 1984 [JP] Japan ................. 59-196354

[51] Int. Cl.$^5$ .............................................. G11B 17/04
[52] U.S. Cl. ................... 369/75.2; 369/77.2; 360/99.03; 360/99.7
[58] Field of Search ............... 360/90, 93, 96.1, 96.2, 360/96.5, 99.02, 99.03, 99.06, 99.07; 369/39, 75.2, 77.2, 75.1, 77.1

[56] References Cited

U.S. PATENT DOCUMENTS

| 4,071,850 | 1/1978 | Sami | 354/195.11 |
| 4,273,342 | 6/1981 | Gilson et al. | 369/39 |
| 4,433,410 | 2/1984 | Siryj et al. | 369/77.2 |
| 4,467,465 | 8/1984 | Saito et al. | 369/77.2 |
| 4,479,210 | 10/1984 | Nakayama | 369/75.2 |
| 4,503,474 | 3/1985 | Nigam | 360/97 |
| 4,507,769 | 3/1985 | Fukumitsa et al. | 369/77.2 |
| 4,545,045 | 10/1985 | Baex et al. | 369/77.2 |
| 4,550,354 | 10/1985 | Wakabayashi et al. | 360/133 |
| 4,573,093 | 2/1986 | Obama et al. | 360/99.06 |
| 4,589,105 | 5/1986 | Nemoto et al. | 369/291 |
| 4,604,666 | 8/1986 | Kitahara et al. | 360/99.06 |
| 4,641,211 | 2/1987 | Okita et al. | 360/99.06 |
| 4,646,176 | 2/1987 | Shimaoka et al. | 360/99.06 |
| 4,656,542 | 4/1987 | Shibata | 360/99.06 |
| 4,707,819 | 11/1987 | Ehara | 369/77.2 |
| 4,716,477 | 12/1987 | Uehara | 360/99.07 |
| 4,727,444 | 2/1988 | Fukushima et al. | 360/99.02 |

FOREIGN PATENT DOCUMENTS

58-1890 1/1983 Japan.
58-41571 9/1983 Japan.

Primary Examiner—David Trafton
Assistant Examiner—Michelle S. Irvine
Attorney, Agent, or Firm—Toren, McGeady & Associates

[57] ABSTRACT

A recording and/or reproducing apparatus using a record bearing medium contained in a cassette which is provided with at least one positioning hole formed therein. The apparatus is provided with an engaging member which is engageable with the positioning hole for loading the cassette at a predetermined position within the apparatus; an urging member for urging the engaging member to engage with the hole; and a disengaging member for selectively disengaging the engaging member from the hole. These parts are arranged to ensure smooth loading and unloading operations on the cassette.

19 Claims, 6 Drawing Sheets

FIG.5B

RECORDING AND/OR REPRODUCING APPARATUS

This is a continuation application of Ser. No. 07/334,810, filed Apr. 6, 1989; which in turn is a continuation application of Ser. No. 07/148,130, filed Jan. 26, 1988, now abandoned; which in turn is a continuation application of Ser. No. 06/777,235, filed Sept. 18, 1985, now abandoned.

CROSS REFERENCE

Disclosed but not claimed is claimed in two copending patent applications of the same assignee, both entitled "Recording and/or Reproducing Apparatus" and filed on the same date of the present invention.

BACKGROUND OF THE INVENTION

1. Field of the Invention

This invention mainly relates to a recording and/or reproducing apparatus of the kind having a record bearing medium container loaded from the front thereof, and more particularly to means for smooth loading and unloading of the container.

2. Description of the Prior Art

Figure 5A:
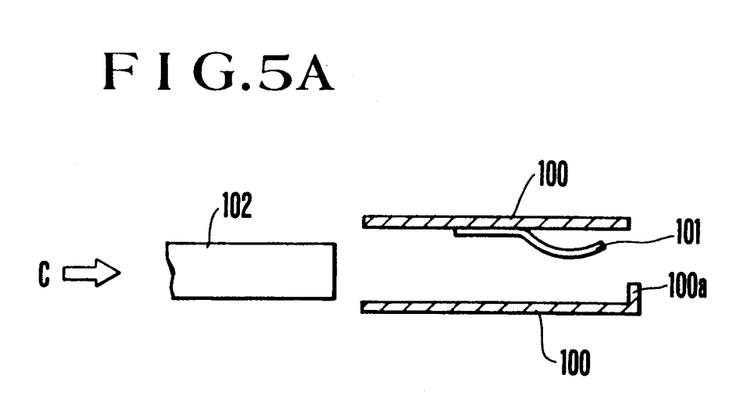
FIGS. 5A and 5B are sectional views showing the cassette holding arrangement of the conventional recording and/or reproducing apparatus, in its states before and after cassette insertion.
Figure 5B:
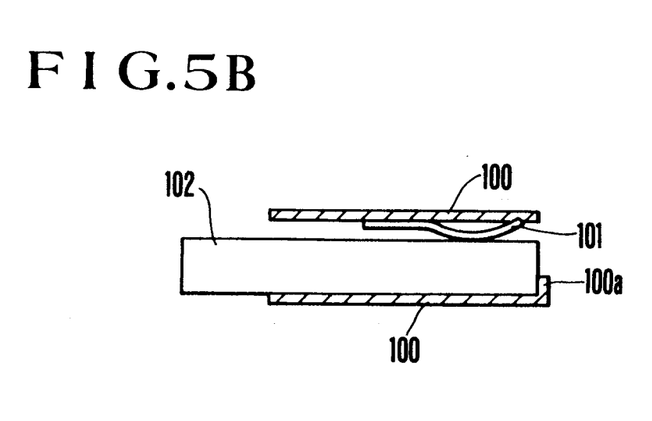

Known recording and/or reproducing apparatuses include a kind arranged to record information while concentrically or helically forming a recording track on a disc-shaped record bearing medium, such as a flexible magnetic recording disc, and/or to reproduce the recorded information therefrom. The disc-shaped record bearing medium is generally placed within a container called a cassette, a jacket or a pack (hereinafter will be referred to as the cassette). For loading the cassette, some of the apparatuses of the above-stated kind are arranged to have it inserted from the front thereof. This arrangement is well known and is called a front loading method. In accordance with the front loading arrangement, the cassette is generally inserted into a cassette holder and is held in position by a pressing member which is provided at the cassette holder. FIG. 5A of the accompanying drawings shows an example of the front loading arrangement. In this case, a leaf spring 101 which has a relatively large pressing force is attached to the upper inner side of a cassette holder 100. When the cassette 102 is inserted into the cassette holder 100 in the direction of arrow C, the cassette 102 comes under the pressing force of the leaf spring 101. Upon arrival of the cassette 102 at a predetermined position defined by a bent part 100a of the cassette holder 100, the cassette 102 is set in a predetermined position within the holder 100 under the pressing force of the leaf spring 101 as shown in FIG. 5B. After that, the holder 100 is horizontally moved, when necessary, and is then moved vertically downward to a predetermined position within the recording and/or reproducing apparatus. Thus, the loading operation is completed. In taking out the cassette 102, an unloading operation is performed in a manner reverse to the loading operation described.

In inserting the cassette 102, however, the arrangement described above necessitates exertion of a large force against the pressing force of the leaf spring 101. Then, in taking out the cassette 102 from the cassette holder 100, a large force must be also exerted against the pressing force of the leaf spring 101. The cassette 102 thus cannot be smoothly inserted and taken out. Besides, the cassette 102 might be damaged by the unsmooth inserting or extracting operation.

This problem can be solved by weakening the pressing force of the leaf spring 101. However, with the pressing force weakened, the cassette 102 tends to be readily moved within the cassette holder 100 by vibrations or when it comes in contact with other members during the horizontal movement of the cassette holder 100.

The applicant of the present application has previously filed U.S. patent application Ser. No. 707,871 (filed Mar. 4, 1985, and entitled "Cassette Loading Device", Uehara) for a novel record bearing medium cassette loading device which is capable of solving the above-stated problems of the prior art devices.

The disclosed loading device for a cassette containing therein a record bearing medium comprises cassette holding means arranged to receive the cassette from a predetermined direction and to be movable in a predetermined direction approximately perpendicular to the receiving direction in a state of holding the cassette, and pull-in means for pulling the cassette into a predetermined position within the holding means, wherein the pull-in means is provided with an engaging member and pulls the cassette into the holding means by engaging the engaging member with a positioning hole provided on the housing of the cassette.

SUMMARY OF THE INVENTION

The present invention relates to a further improvement on the above-stated device previously proposed by the present applicant. It is a principal object of this invention to provide a novel cassette loading device and a recording and/or reproducing apparatus having the cassette loading device which is capable of ensuring adequate cassette loading and unloading with a smooth and accurate operation on a cassette housing a record bearing medium without damaging the cassette and excels in operability permitting the operation to be carried out with a light force.

Under this object, a cassette loading device embodying an aspect of this invention and incorporated in a recording and/or reproducing apparatus using a cassette which houses a record bearing medium and is provided with at least one positioning part, comprises: an engaging member arranged to engage with an engaging part provided on the record bearing medium containing cassette; urging means for urging the engaging member to engage with the engaging part; and a disengaging member arranged to selectively disengage the engaging member from the engaging part.

The engaging part of the container or the cassette may be a positioning hole generally provided in the cassette of this kind.

In accordance with this invention, the engaging member which is urged by the urging means engages and disengages with and from the engaging member without fail in response to the loading and unloading operations on the record bearing medium container or cassette. The apparatus is thus arranged to be capable of stably keeping the cassette in position without recourse to an urging member which has a large pressing force and has been conventionally used for cassette pressing and holding means. The apparatus never damages the cassette and other parts. Further, unlike in the conventional apparatus where an urging member of a small pressing force is employed, the arrangement according to this invention eliminates the fear of inadequate loading due to the displacement of the cassette resulting from its contact with other members.

The above and further objects, aspects and features of this invention will be apparent from the following detailed description of a preferred embodiment thereof taken in connection with the accompanying drawings.

DETAILED DESCRIPTION OF THE PREFERRED EMBODIMENT

The following describes an embodiment of this invention with a rotary magnetic recording disc employed as the record bearing medium. The description includes the arrangement of a cassette containing the medium and having a shutter; a shutter opening and closing mechanism; front and rear holder parts; a cassette loading mechanism; a stabilizer plate raising-and-lowering and center core pressing mechanism; and the operation of a recording and/or reproducing apparatus arranged as the preferred embodiment of this invention. This invention is not limited to the embodiment described herein but is also applicable to other varied types of recording and/or reproducing apparatuses including an optical type, an electrostatic capacity type and a type using a tape-shaped record bearing medium.

Figure 1:
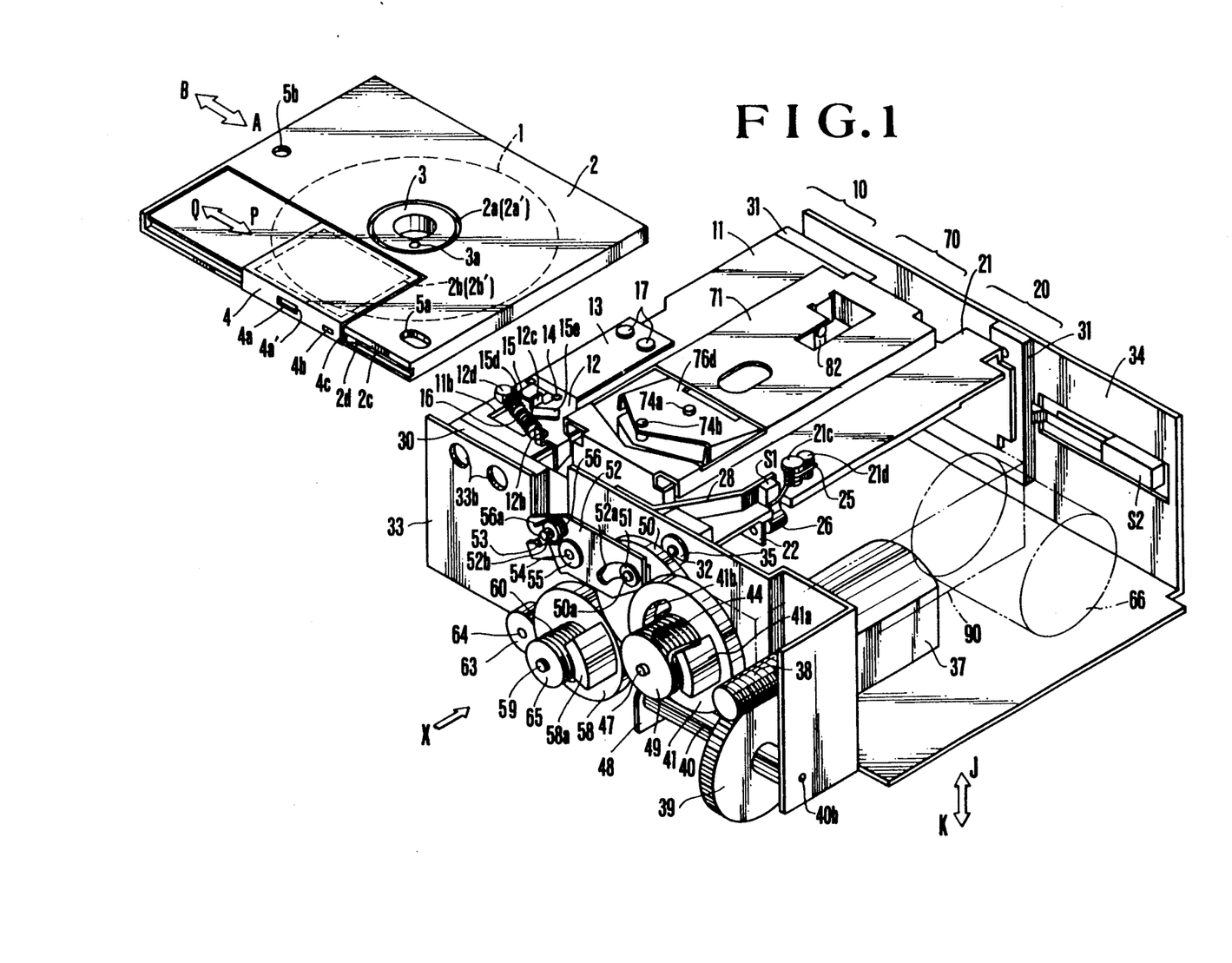
FIG. 1 is an oblique view showing the overall arrangement of a recording and/or reproducing apparatus arranged according to this invention as an embodiment thereof.

Arrangement of the cassette and the shutter (FIG. 1)

Referring to FIG. 1, a flexible magnetic disc 1 is used as an example of the disc-shaped record bearing medium usable according to this invention. A cassette 2 contains the magnetic recording disc 1. A center core 3, which is secured to the middle part of the magnetic disc 1, is made of a synthetic resin. A PG pin 3a, which is provided for indicating the rotation phase of the disc 1, pierces the center core 3. The pin 3a will be further described later with reference to FIGS. 4A and 4B. A hole 2a is formed in the upper side of the cassette 2 in a position corresponding to the center core 3. A similar hole 2a' is formed also in the lower side of the cassette 2. A window 2b is provided in the upper side of the cassette 2 for allowing a stabilizer plate (74 of FIG. 4A) to enter the cassette 2. Another window 2b' is formed in the lower side of the cassette 2 in a position corresponding to the window 2b and is arranged to allow a magnetic head (94 of FIG. 4A) to enter the cassette 2. The stabilizer plate entering window 2b and the magnetic head entering window 2b' are arranged to be normally covered with a shutter 4 which, in turn, is arranged to be movable in the directions of arrows P and Q. The shutter 4 is provided with a shutter closing hole 4a, which is arranged to have a shutter closing claw (15c of FIG. 2) plunge thereinto, and a locking claw 4b which is arranged to engage a shutter lock member 2d. Reference numeral 4a' denotes the end face of the hole 4a and another numeral 4c the end face of the shutter 4. A sliding slit 2c is provided in the side face of the cassette 2 for enabling the shutter closing claw 15c The shutter lock member 2d, which is made of a plastic material is disposed on one side face of the cassette 2. When the shutter 4 moves in the direction of arrow Q relative to the cassette 2, the windows 2b and 2b' for the stabilizer plate and the magnetic head are opened. These windows are closed when the shutter moves in the direction of arrow P.

A pair of positioning holes 5a and 5b are provided in the cassette 2 for use by the apparatus in positioning the cassette 2 at the time of loading. Both the positioning 5a and 5b pierce the upper and lower sides of the cassette 2. The hole 5a is in an elliptic shape and is located on the same side as the shutter 4 relative to the direction of arrow A in which the cassette 2 is inserted, and is located at a corner part on the upstream side of the shutter 4. The other hole 5b is in a circular shape and is located in the middle of the rear part of the cassette 2 also relative to the direction of arrow A. In the case of this embodiment, the hole 5a also serves as an engaging part to engage an engaging member 26 which will be described later herein. However, in accordance with this invention, the engaging part may be arranged separately from the positioning hole 5a.

Figure 2:
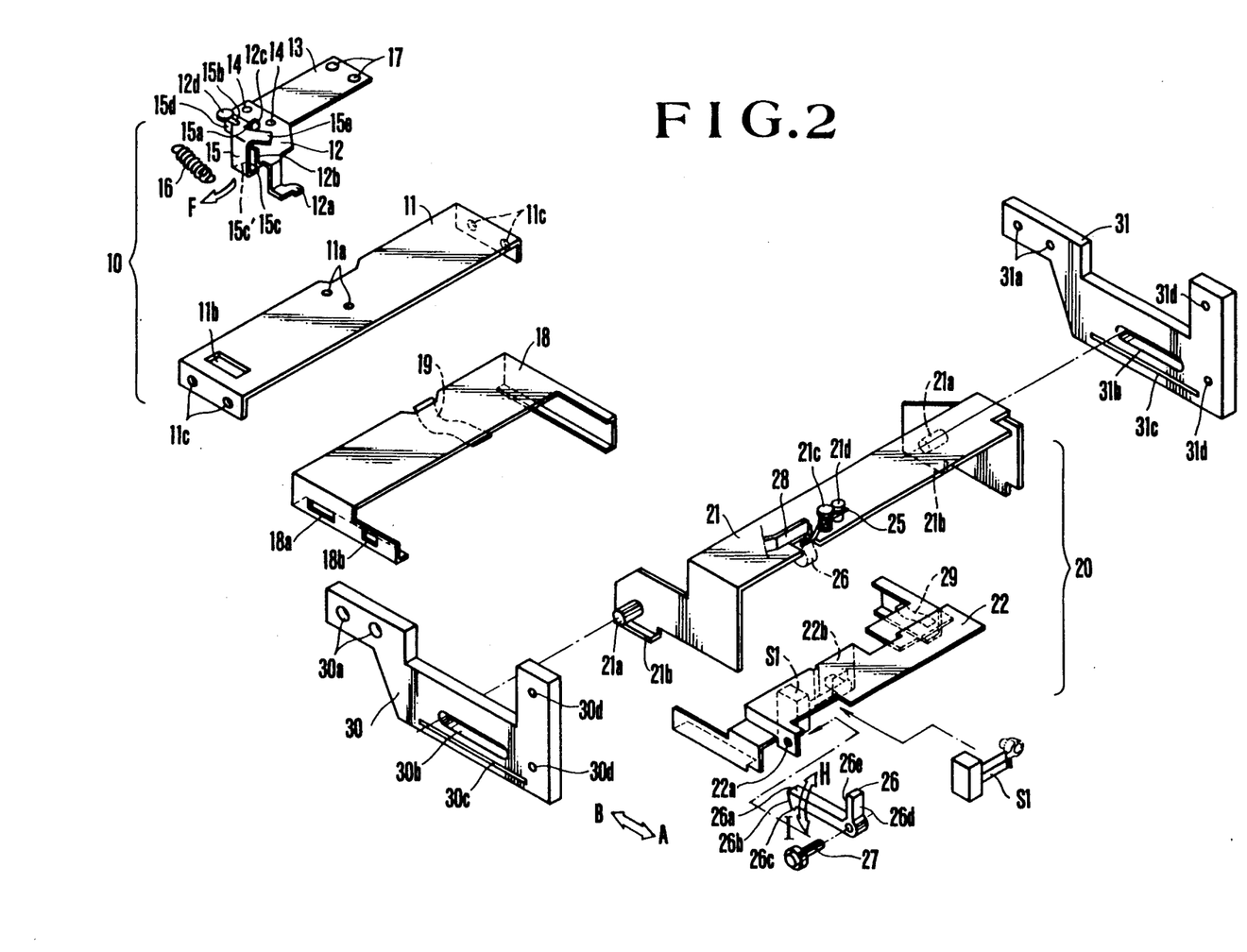
FIG. 2 is an exploded oblique view showing the details of a front holder part and a rear holder part included in the illustration of FIG. 1.

Shutter opening and closing mechanism (FIGS. 1 and 2)

Referring to FIGS. 1 and 2, a cassette holder part for holding the cassette 2 includes a front holder part 10 and a rear holder part 20, which are arranged separately from each other. The front holder part 10 includes a front half 11 and a front holder 18. On the upper surface of the front half 11 is disposed a shutter opening member 12. The member 12 is attached to a leaf spring 13 by means of pins 14 and is provided with an opening claw 12a which is arranged at a C-shaped bent part thereof to open the shutter 4. The shutter opening member 12 is further provided with a spring hook part 12b which is arranged at one end of the member 12 to hook one end of a spring 16. Pins 17 are arranged to secure the shutter opening member 12 at its tail end part to the front half 11 in such a way as to make it vertically swingable on the front half 11. A bent part 12c is arranged to rise from the flat surface of the shutter opening member 12 to engage with a cam part 15e of a shutter closing member 15, which will be described later. A guide pin 12d is erected on the shutter opening member 12 and is thus arranged to stabilize the movement of the shutter closing member 15.

The shutter closing member 15 is disposed on the shutter opening member 12 and is arranged as follows: An end face 15a of the shutter closing member 15 is arranged to abut on one end of the bent part 12c of the shutter opening member 12. A cam part 15e continues from the abutting end face. When the closing member 15 moves relative to the opening member 12, the cam part 15e comes to abut on one end of the bent part 12c of the shutter opening member 12. This causes the closing member 15 to turn in the direction of arrow F on the guide pin 12d. The guide pin 12d has a slot 15b of the closing member 15 fittingly engaged therewith. A closing claw 15e is arranged at a C-shaped bent part of the shutter closing member 15 to close the shutter 4. A spring hook part 15d is provided at one end of the shutter closing member 15. The spring 16 is arranged between the spring hook part 15d and the spring hook part 12b of the shutter opening member 12. The spring 16 is thus arranged to urge the shutter closing member 15 to turn counterclockwise on the guide pin 12d.

The closing claw 15c of the shutter closing member 15 is arranged to plunge into the closing hole 4a of the shutter 4 shown in FIG. 1. The shutter opening claw 12a opens the shutter 4 when the cassette 2 is inserted in the direction of arrow A. Then, the shutter closing claw 15c falls into the hole 4a. When the cassette 2 is taken out in the direction of arrow B, the shutter 4 is closed by means of the claw 15c which is in the hole 4a. To enable the closing claw 15c to easily ride across the edge face 4c of the shutter 4, the claw 15c is provided with a tapered part 15c'.

Front holder and rear holder parts (FIGS. 1 and 2)

The details of the cassette holder parts mentioned in the foregoing are as follows: In the front holder part 10, the front half 11 is arranged to carry the front holder 18 with the latter secured to the former by means of screws or the like which are not shown. The leaf spring 13 is secured to and carried by the front half 11 by means of pins 17, which are caulked at caulking holes 11a. A slot 11b is formed in the front half 11. The vertical part of the cassette closing member 15 is inserted through this slot 11b. Screw holes 11c are provided in the front half 11 for connecting a guide 30 to the front half 11 by means of screws. The front half 11 is thus secured to the guide 30 via facing holes 30a. Another pair of screw holes 11c are symmetrically arranged on the opposite side of the front half 11. A guide 31 on the opposite side and the front half 11 are thus connected to each other also via facing holes 31a provided in the guide 31. In other words, the front half 11 and the guides 30 and 31 are thus arranged to operate in one unified body. A leaf spring 19 is arranged at the ceiling of the front holder 18 to press the cassette 2. The front holder 18 is provided with holes or slots 18a and 18b formed in one side wall of the front holder 18. The slot 18a serves as an escape hole for the closing claw 15c and the other slot 18b as an escape hole for the opening claw 12a.

In the rear holder part 20, a rear half 21 carries a rear holder 22. The rear holder 22 is attached to the rear half 21 by means of screws or the like. Pins 21a are provided on both sides of the rear half 21 as shown in FIG. 2. Theses pins 21a are respectively fitted in the slots 31b and 31b provided in the guides 30 and 31. By virtue of this arrangement, the rear half 21 is movable in the directions of arrows A and B along the slots 30b and 31b. The rear half 21 is provided with bent parts 21b which are symmetrically formed on both sides of the rear half 21. These bent parts 21b fit in slits 30c and 31c which are formed in the guides 30 and 31. This prevents the rear half 21 from turning on the pins 21a and, at the same time, allows the rear half 21 to move in the directions of arrows A and B.

An engaging member 26 embodies, by way of example, an essential feature of this invention in conjunction with a disengaging member 28. The engaging member 26 is arranged to engage with the positioning hole 5a of the cassette 2 and, for the reason described hereinafter, has an end part 26a, a tapered part 26b and engaging part 26c thereof preferably either entirely or partially made of a plastic material. A shaft 26 is arranged to pivotally carry the engaging member 26 to permit it to turn in the direction of arrows H and I as shown in FIG. 2. The shaft 26 is secured to the holding part 22a of the rear holder 22 by caulking or the like. The drawing shows a spring 25 as means for urging the engaging member 26 to turn in the direction of arrow I toward the positioning hole 5a. The spring 25 is carried by a shaft 21c and has its rear end attached to a stud 21c. The fore end of the spring 25 is arranged to push the side face 26d of the engaging member 26. The disengaging member 28 is secured, for example, to a side chassis 33 and is arranged to abut on another side face 26e of the engaging member 26 which is located on the side opposite to the side face 26d while the cassette 2 is not inserted into the apparatus. Under that condition, the spring 25 is prevented from turning the engaging member 26 in the direction of arrow I indicated in FIG. 2. If the engaging member 26 itself is made of some elastic material such as a leaf spring and is arranged to have its bent part engageable with the positioning hole 5a, the engaging member 26 can be urged toward the positioning hole 5a without recourse to the use of the spring 25, etc. In that case, the disengaging member 28 may be arranged to act on this bent part to control the engagement of the bent part with the hole 5a.

A leaf spring 29 is arranged to press the cassette 2 while the rear holder 22 is provided with an abutting part 22b. With the abutting part 22b pushed by the cassette 2 when the cassette 2 is inserted, the rear holder 22 slides in the direction of arrow A along the slots 30b and 31b of the guides 30 and 31. A shaft 32 is carried by holes 30d and 31d which are provided in these guides 30 and 31. While the front holder part 10 is arranged to be movable together with the guides 30 and 31 in one unified body with them, the rear holder part 20 is arranged to be movable relative to the guides 30 and 31 along the slots 30b and 31b in the directions of arrows A and B as mentioned above.

A switch S1 is arranged to detect the insertion of the cassette 2. Another switch S2 is arranged in combination with the switch S1. In the case of this specific embodiment, the switch S1 is disposed in a position to operate when the cassette 2 is inserted into the apparatus and comes to abut on the abutting part 22b of the rear holder 22. The switch S2 is disposed in a position to operate when the cassette 2 is further inserted to come to a state as shown in FIG. 3B.

Cassette loading mechanism (FIGS. 1 and 3A–3C)

Figure 3A:
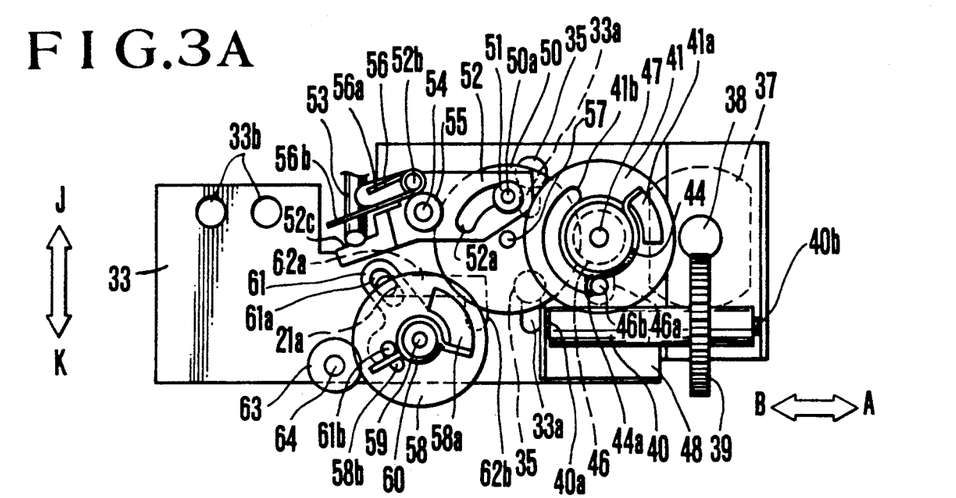
FIGS. 3A, 3B and 3C are side views showing a gear train as in different states as viewed from the direction of arrow X indicated in FIG. 1, FIG. 3A showing it in a state before insertion of a cassette, FIG. 3B in a state at the start of a loading switch operation and FIG. 3C in a state at the end of cassette loading.
Figure 3B:
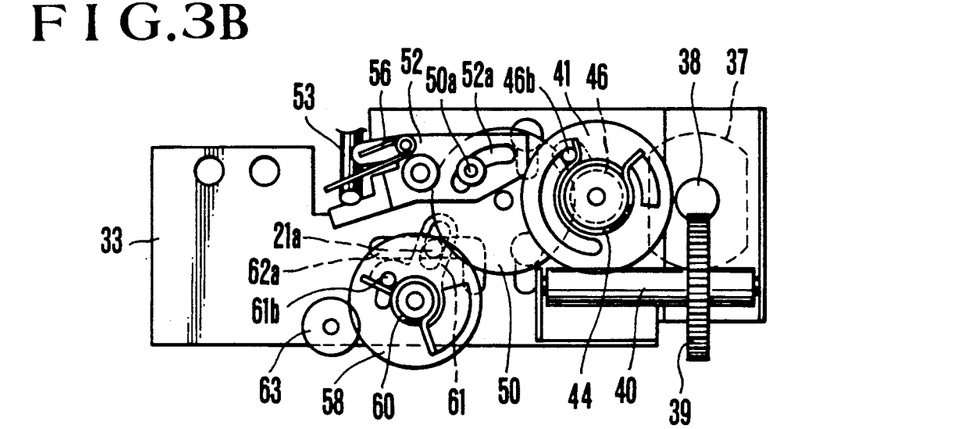
Figure 3C:
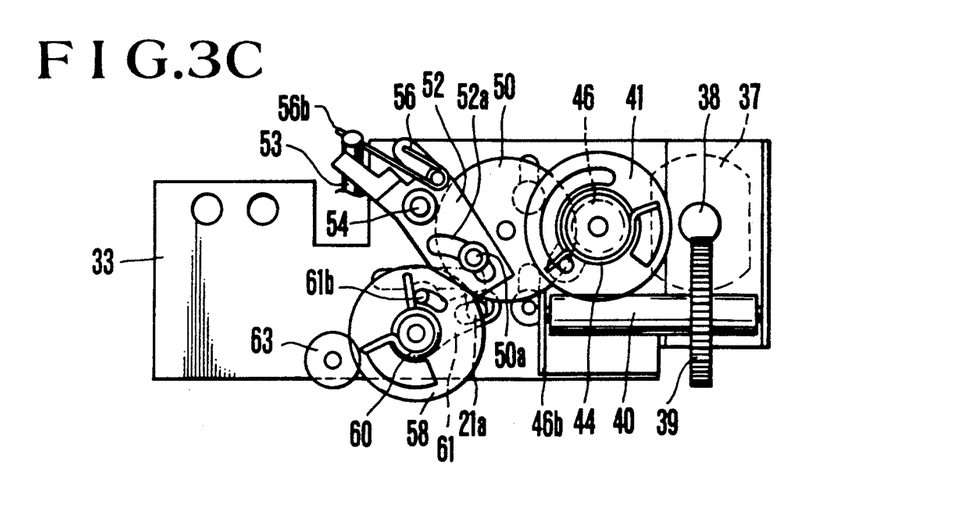

FIGS. 3A, 3B and 3C are side views of the embodiment as viewed in the direction of arrow X indicated in FIG. 1. These figures show the various states of the cassette loading mechanism of the embodiment of this invention and particularly the movement of a gear train during a cassette loading operation. FIG. 3A shows the state of the mechanism before loading; FIG. 3B the state of the mechanism at the beginning of the operation of the loading switch S2 (FIG. 1) after cassette insertion; and FIG. 3C the state of the mechanism at the time of completion of the loading operation.

The shafts 32 (FIG. 1) are carried by the holes 30d and 31d which are provided in the guides 30 and 31, two in each of the guides. Two slots 33a are formed in each of the side chassis 33 and a sub-chassis 34 (only the two on the side of the side chassis 33 are shown in FIGS. 3A, 3B and 3C). The shafts 32 are fitted into these slots 33a via rollers 35 (only two of them on the side of the side chassis 33 are shown in FIGS. 3A, 3B and 3C). This arrangement enables the guides 30 and 31 to move in the longitudinal direction of the slots 33a. In other words, they are movable in the directions in which the cassette 2 ascends and descends. Although the side chassis 33 and the sub-chassis 34 are shown as being in one unified body in the drawing, they are preferably arranged to be separable to facilitate the precise mounting work such as caulking on the shafts of the gear train which will be described later. The separable arrangement of these chassis thus facilitates whole assembly work.

The illustration of FIGS. 3A–3C also includes a loading motor 37; a worm gear 38 which is mounted on the output shaft of the motor 37; a worm wheel 39; a worm gear 40 which is arranged to turn together with the worm wheel 39; and another worm wheel 41. The worm wheel 41 is provided with a raised part 41a, which is arranged to charge a spring 44, and a thorough slot 41b which is formed in an arcuate shape encircling a shaft 47. A spur gear 46 is disposed on the reverse side of the wheel 41 and is arranged to turn on the shaft 47. A tongue-shaped part 46a of the gear 46 has a pin 46b erected thereon. The pin 46b pierces the slot 41b to have one end of the spring 44 attached thereto. Since the worm wheel 41 and the spur gear 46 are separated from each other, the rotating drive force of the motor 37 is transmitted to the spur gear 46 via the pin 46b. During the rotation of the worm wheel 41, a force develops in the direction of thrust. Therefore, a keep plate 49 (FIG. 1) is arranged to retain the worm wheel 41. A bearing 48 is arranged to pivotally carry the shaft end 40a of the worm gear 40. The other shaft end 40b of the worm gear 40 is carried by the sub-chassis 33.

Figure 4A:
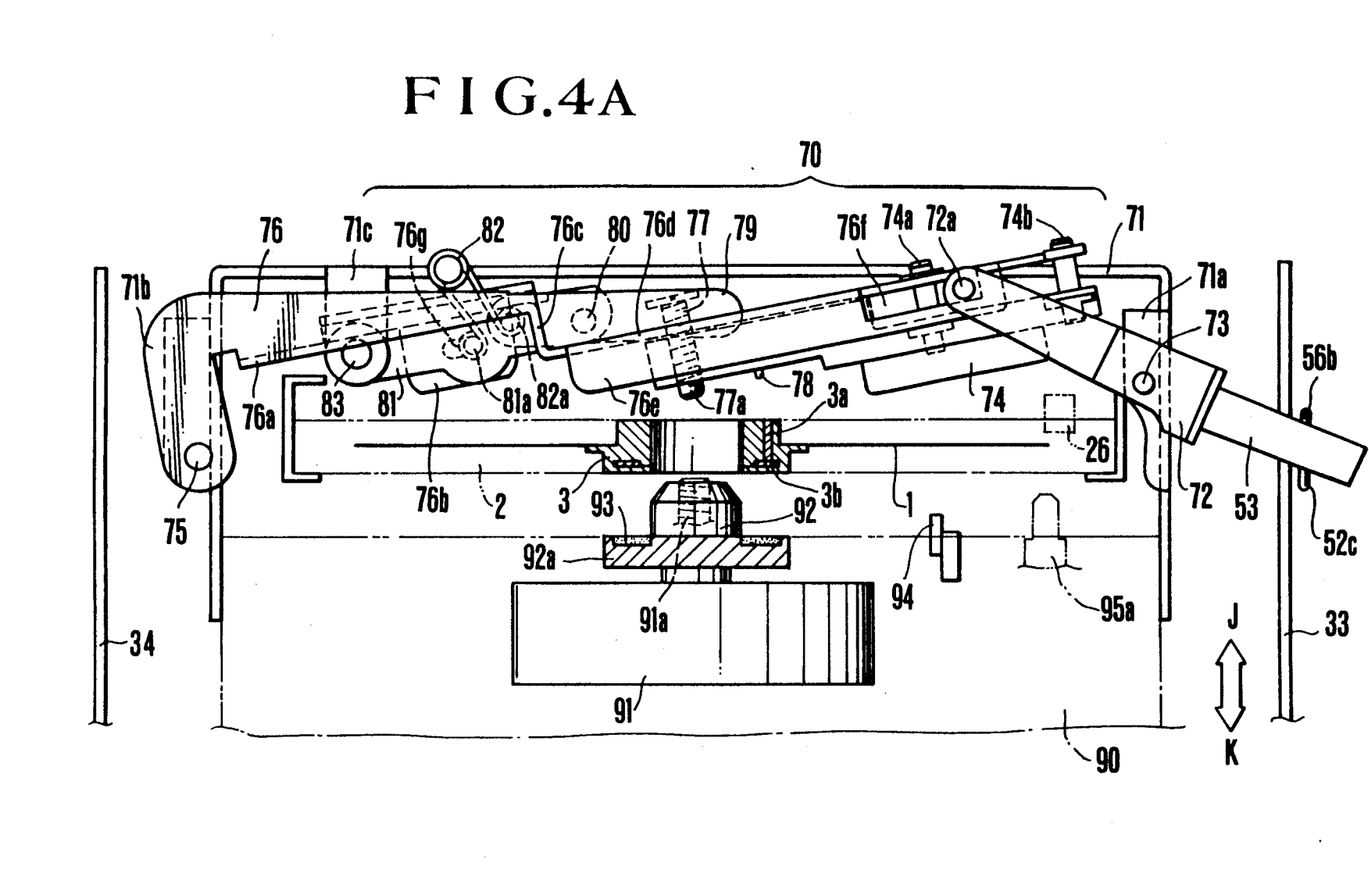
FIGS. 4A and 4B are sectional views showing the details of a stabilizer plate raising-and-lowering and center core pressing mechanism shown in FIG. 1, in their varied states with the cassette in its raised and lowered positions.

A spur gear 50 is arranged to engage the spur gear 46 and to turn on a shaft 57. A pin 50a is erected on the gear 50. The pin 50a pivotally carries a roller 51 which fittingly engages a cam slot 52a which is provided in a lever 52. The lever 52 is arranged to actuate a lever 53 which causes the ascent and descent of a stabilizer plate 74 (FIG. 4A). The illustration further includes the shaft 54 of the lever 52; a washer plate 55; a pin 52b, which is erected on the lever 52 and is arranged to pivotally carry a spring 56, one end 56a of which is secured to the lever 52 while the other end 56b is arranged to urge the end part 52c of the lever 52; and another spur gear 58 which is arranged to engage the spur gear 50 and to turn on a shaft 59. The flat gear 58 is provided with a raised part 58a, which is arranged to charge a spring 60, and a thorough slot 58b which is formed in an arcuate shape encircling the shaft 59. A lever 61 is arranged to turn on the shaft 59 of the spur gear 58. The lever 61 is provided with a slot 61a which is arranged to fittingly engage a pin 21a erected on the rear half 21, and a pin 61b which pierces the slot 58b extending toward the surface of the paper of the drawing of FIG. 3A. The pin 61b is urged by the spring 60 to move clockwise. As shown in FIG. 3A, the side chassis 33 is provided with a slot consisting of a horizontally extending part 62a and a vertically extending part 62b. When the spur gear 58 rotates, a rotating driving force is transmitted via the spring 60 to the pin 61b. This causes the lever 61 to turn. The pin 21a, which is erected on the rear half 21, moves in the direction of arrow A or B along the slot part 62a and also in the direction of arrow J or K (ascending or descending direction of the cassette 2) along the other slot part 62b.

With the embodiment arranged as described above, the rear holder part 20 is movable in the directions of arrows A and B and also in the directions of arrows J and K. Meanwhile, the front holder part 10 and the guides 30 and 31 are movable only in the directions of arrows J and K. Another set of the members and parts from the spur gear 58 to the slot parts 62a and 62b are arranged on the risen parts of the sub-chassis 34 on the opposite side in a symmetrical manner. The shaft 64 of the spur gear 63 which engages with the flat gear 58, extends toward the sub-chassis 34 to transmit the driving force of the chassis 34. The illustration further includes a washer plate 65; a stepping motor 66 which is arranged to move a recording and/or reproducing head 94 (FIG. 4A) in the radial direction of the magnetic disc 1; and two holes 33b provided in the side chassis 33 (similar holes are symmetrically provided also in the sub-chassis 34). These holes 33b are arranged to permit insertion of screw drivers through them at the last step of assembly work for fixing the front holder part 10 and the guides 30 and 31 in positions.

Stabilizer plate raising-and-lowering and center core pressing mechanism (FIGS. 1, 3A–3C and 4A and 4B)

Figure 4B:
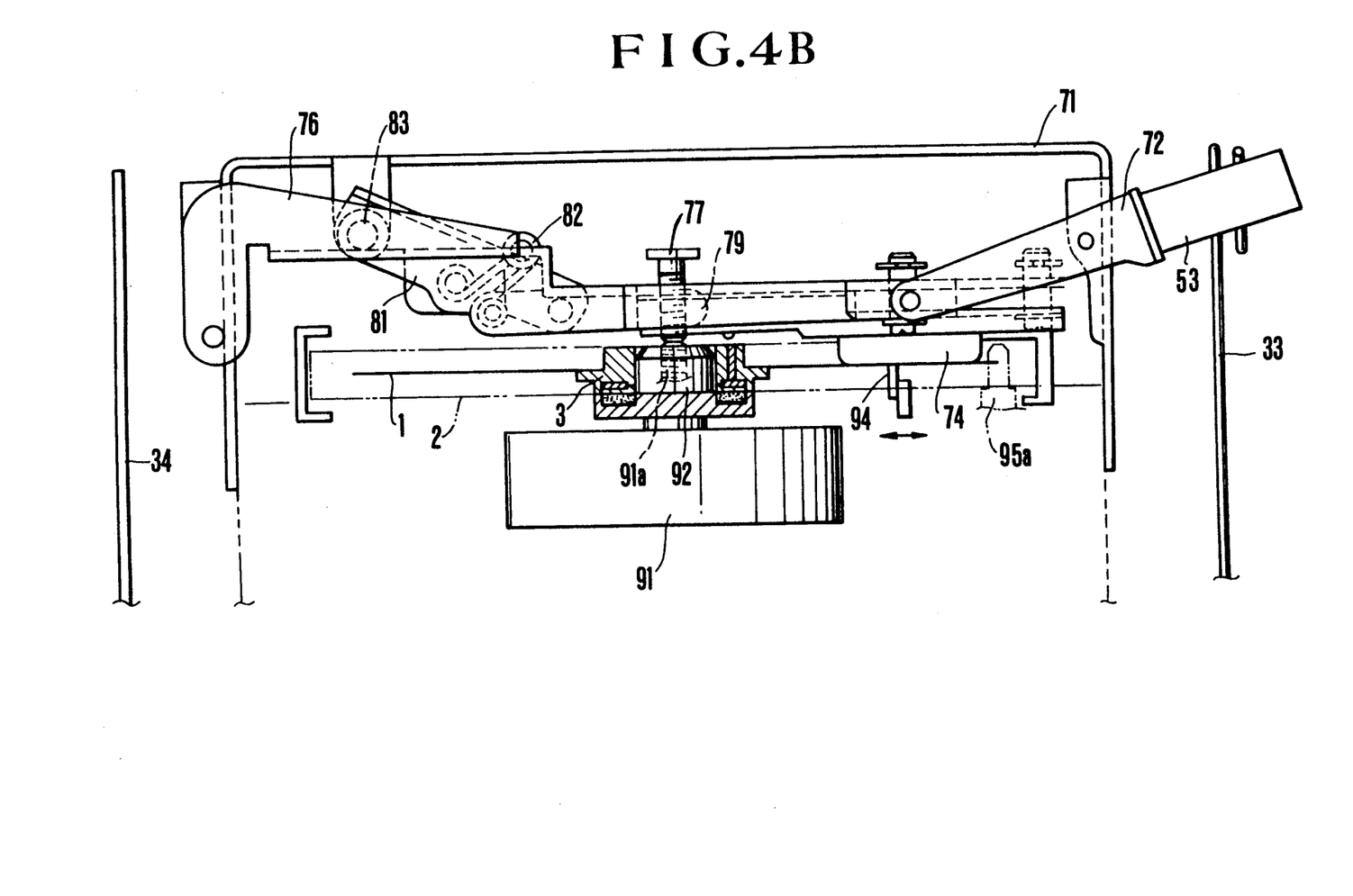

FIGS. 4A and 4B show the stabilizer plate raising-and-lowering and center core pressing mechanism of the embodiment of this invention as viewed in the direction of arrow A indicated in FIG. 1, FIG. 4A showing the cassette 2 in its raised position and FIG. 4B showing it in its lowered position. A reference numeral 74 denotes a stabilizer plate. Another numeral 79 denotes a center core pressing member. Referring to FIGS. 1, 4A and 4B, a reference numeral 70 denotes the stabilizer plate raising-and-lowering and center core pressing mechanism. A frame 71 is arranged to have the mechanism 70 mounted thereon. A reference numeral 90 denotes the body of the apparatus. A disc rotating motor 91 shown in FIG. 4A is of the outer rotor type. The motor 91 includes a fixed shaft 91a which is disposed in the middle thereof; and a receiving part which is arranged at the fore end thereof to receive the abutting part 77a formed at the fore end of a screw 77. In FIG. 4A, a positioning pin 95a is shown as arranged to cooperate with the positioning hole 5a in positioning the cassette 2. However, another positioning pin for the other positioning hole 5b is omitted from the drawing. The frame 71 is secured to the apparatus body 90. In this specific example of the embodiment, all the arrangements and members participating in the pressing or pushing operation on the center core 3 and the vertical moving operation on the stabilizer plate 74, are mounted on the frame 71. A lever 72 is pivotally supported via a shaft 73 by a bent part 71a of the frame 71. The lever 72 is provided with a pin 72a which is erected on the fore end part of the lever and a stabilizer plate moving lever 53, which is erected on the rear end part thereof. The lever 72 is urged to turn on a shaft 73 by one end 56b of the spring 56.

The stabilizer plate 74 is provided for the purpose of stabilizing the rotation of the magnetic disc 1 by keeping the head 94 and the disc 1 in satisfactory contact with each other or by keeping them confronting each other across an air layer of thickness not exceeding 0.5 μm (for example) or thereabout under a recording or reproducing condition. Although it is not shown in the drawing, another stabilizer plate may be arranged beneath the magnetic disc 1. The plate 74 is provided with pins 74a and 74b. These pins are arranged to be used for hanging the stabilizer plate 74 by means of a lever 76 which will be described later. A conical coiled spring which is not shown is interposed in between the lever 76 and the stabilizer plate 74. The stabilizer plate 74 is thus always urged in the direction of arrow K in relation to the lever 76 as shown in FIG. 4A.

The lever 76 is pivotally supported by a bent part 71b of the frame 71 and is in the following shape: The lever 76 has a wide part which extends sidewise in the neighborhood of the shaft 75 in parallel with the paper surface of the drawing. The wide part extends upward to a certain extent and then perpendicularly bends. On the lower side of the bent part, a portion 76a extends from the paper surface side of the drawing to the back surface side of the paper. Then, on the back side, a part of the lever 76 bends downward to form a part 76b. Another part 76d comes, via a stepped part 76c, to extend from the paper surface side to the back surface side. A part 76e of the lever is arranged to extend downward on the paper surface side of the drawing as viewed in FIG. 4A. A slot 76f is formed in the part 76e of the lever 76. The pin 72a fittingly engages with the slot 76f. A screw 77 is threaded and has its fore end abutting part 77a arranged to abut on the fore end of the central fixed shaft 91a of the motor 91 thus permitting adjustment of the height of the stabilizer plate 74. The apparatus body 90 is provided with two receiving parts which are not shown but are arranged to receive the stabilizer plate 74 when the plate comes down. The urging force exerted on the stabilizer plate 74 in the direction of arrow K is arranged to be sustained by three parts including these receiving parts and the fore end of the central fixed shaft 91a of the motor 91. A numeral 78 denotes one end of a PG yoke having a PG coil which is wound around the yoke.

A center core pressing member 79 is provided for the purpose of having the center core 3 accurately fitted on a spindle 92. The member 79 is forked in such a way as not to overlap the spindle 92 and is pivotally supported by a shaft 80 on a lever 81 which will be described later. One end 82a of a toggle spring 82 is connected to the pressing member 79. The other end of the toggle spring 82 is connected to a pin 81a which is erected on the lever 81. The pin 81a is fitted into the slot 76g formed in the lever 76. The lever 81 is pivotally supported by the bent part 71c of the frame 71 via a shaft 83.

As shown in FIG. 4A, the PG pin 3a is secured by planting or the like to a ring 3b, which is made of a magnetizable material, and is secured to the center core 3. The spindle 92 is provided with a flange part 92a. A permanent magnet 93 is attached to the flange part 92a. The magnetic flux of the permanent magnet 93 passes through the ring 3b and the PG pin 3a to produce a leakage magnetic flux to the outside of the center core 3. The magnetic flux flowing to the PG yoke 78 reaches a maximum value when the PG pin 3a comes to a point opposite to the PG yoke 78 with the center core 3 rotated. The magnetic flux decreases accordingly as the PG pin 3a moves away. By this, a voltage which varies with time is developed at the coil wound on the PG yoke 78, so that the rotation phase of the magnetic disc 1 can be detected through this voltage. Further, it is possible to arrange the spindle 92 to be mechanically coupled with the center core 3 by virtue of the magnetic action of the permanent magnet 93 and the ring 3b.

The operation of a recording and/or reproducing apparatus embodying this invention (FIGS. 1-4B)

A recording and/or reproducing apparatus embodying the arrangement of this invention as shown in FIGS. 1 to 4B operates as described below. The description will be made in the order of a cassette loading operation and the shutter opening and closing operation in association therewith; the ascent and descent of the stabilizer plate and the center core pressing operation; and an unloading operation.

When the operator manually inserts the cassette 2 into the cassette holder, the cassette 2 first comes into contact with the abutting part 22b of the rear holder 22 (FIG. 2). The cassette 2 is pushed further in the direction of arrow A. This causes the whole rear holder part 20 to be pushed in the direction of arrow A. The cassette insertion detection switch S1 comes to operate under this condition. With the rear holder part 20 thus moved, the lever 61 is caused, via the pin 21a, to turn clockwise. Then, the pin 61b erected on the lever 61 causes the gear to turn clockwise. The spur gear 50, which engages the gear 58, turns counterclockwise. The gear 46, which engages the spur gear 50, turns clockwise. Meanwhile, the worm wheel 41, which is disposed on the front side of the gear 46, does not turn. Therefore, the pin 46b, which is disposed on the tongue shaped part 46a of the gear 46, charges the spring 44 while turning clockwise along the slot 41b provided in the wheel 41. The counterclockwise turning of the gear 50, on the other hand, causes the pin 50a, which is provided on the spur gear 50, to move counterclockwise. During this process, however, the lever 52 does not turn on the shaft 54 because of the shape of the cam slot 52a provided in the lever 52.

FIG. 3B shows the gear train, etc., mentioned above as in their rotated state obtained a result of the manual insertion of the cassette 2. Under this condition, the cassette loading switch S2, which is shown in FIG. 1, is operated by the shoulder part of the rear half 21. In response to the operation of the switch S2, the loading motor 37 begins to rotate in the loading direction. Then, if the operator removes his or her hand from the cassette 2 before there obtains the condition of FIG. 3B, the returning force of the spring 44 brings the pins 46b and 21a back to their positions of FIG. 3A and the cassette 2 is then ejected or discharged to the outside. Loading begins when there obtains the condition of FIG. 3B. The rotary driving force of the loading motor 37 is transmitted to the worm gear 38, worm wheel 39, worm gear 40 and worm wheel 41. The worm wheel 41 turns clockwise. When the worm wheel 41 turns to a degree corresponding to the length of the slot 41b, the pin 46b and, accordingly, the gear 46 turns clockwise. The spur gear 50 turns counterclockwise. The gear 58 turns clockwise. Further, the spring 60 causes, via the pin 61b, the lever 61 to turn clockwise. As a result of that, each of the pins 21a, which are fitted in the slot 61a, moves in the direction of arrow A along the slot 62a of the side chassis 33 or the similar slot provided in the sub-chassis 34. The rear holder part 20 is thus caused to move in the direction of arrow A by the driving force of the loading motor 37. Then, the cassette 2 is pulled further into the front holder 18.

The operations of the engaging member 26 and the disengaging member 28, which embody an important aspect of this invention, are as follows: When the cassette 2 is not inserted as shown in FIGS. 1 and 3A, the rear holder part 20 is urged by the urging force of the spring 44 which is exerted in the direction of arrow B as indicated in FIG. 3A. This is because the urging force of the spring 44 is urging the pin 21a to move toward the left end of the slot 62a via the engagement among the gear train 46, 50 and 58. Under this condition, the engaging member 26 abuts on the disengaging member 28 and is in a position to which it has been brought by the disengaging member 28 turning on the shaft 27 in the direction of arrow H. With the engaging member 26 in this position, the cassette 2 can be inserted in a direction from the paper surface to the reverse side of the paper as viewed in FIG. 4A. In case where there is room in the height of the apparatus, the end part 26a of the engaging member 26 may be arranged to be located beneath the stabilizer plate 74 leaving some clearance to have it not in contact with the plate 74. In the case of an apparatus of the kind arranged to have the cassette 2 loaded from the front, and particularly in the case of a recording and/or reproducing apparatus of the kind using a still video cassette as in the case of this specific embodiment of the invention, the stabilizer plate raising-and-lowering and center core pressing mechanism 70 inevitably comes to have the largest height within the apparatus. Therefore, arrangements to reduce the height of this part contribute to reduction in the thickness of the whole apparatus. In view of this, in this specific embodiment, the tapered fore end part 26b of the engaging member 26 is arranged to overlap; to a slight extent, the cassette 2 in the direction of thickness of the cassette 2. When the cassette 2 is inserted under this condition, the tapered part 26b is pushed by the end face of the cassette 2. Then, the engaging member 26 turns further in the direction of arrow H against the urging force of the spring 25 which is exerted on the side face of the engaging member 26. The end part 26a of the member 26 comes into contact with the stabilizer plate 74 and thus pushes the stabilizer plate 74 to a slight extent upward in the direction of arrow J as indicated in FIG. 4A. This movement is then absorbed by a play or the like left between the pin 72a of the fore end of the lever 72 and the slot 76f of the lever 76 within the mechanism 70. The engaging member 26, or at least a part of it, is preferably made of a plastic material for the following reason: If the engaging member 26 is made of a metal or the like, the lower surface of the stabilizer plate 74 and a part of the cassette 2 around the positioning hole 5a would be damaged. Then, such damage might come to hinder normal recording or reproduction. Whereas, the use of a plastic material for the engaging member 26 never causes such inconvenience.

With the cassette 2 inserted, when it pushes the abutting part 22b of the rear holder 22, the whole rear holder part 20 is moved in the direction of arrow A. The engaging member 26 then moves away from the disengaging member 28. The urging force of the spring 25 causes the engaging member 26 to turn in the direction of arrow I. The engaging part 26c of the member 26 then comes to engage with the positioning hole 5a of the cassette 2. In this instance, with the tapered part 26b, the shape of the engaging part 26c and the position of the spring 29 suitably arranged, even a small urging force of the spring 25 gives a sufficiently large force for pulling the cassette 2 in the direction of arrow A via engagement with the engaging member 26. Therefore, the cassette loading operation can be accurately accomplished.

In pulling out the cassette 2, on the other hand, the disengaging member 28 again abuts on the engaging member 26 when the rear holder part 20 which carries the cassette 2 comes back to the disengaging member 28. The engaging member 26 then turns in the direction of arrow H against the urging force of the spring 25. This causes the engaging part 26c of the engaging member 26 to move away from the positioning hole 5a to permit the cassette 2 to be pulled out further in the direction of arrow B indicated in FIG. 2.

In accordance with the arrangement described, therefore, the cassette 2 can be engaged with and disengaged from the cassette holder part without fail by virtue of the engaging member 26, the spring 25 and the disengaging member 28. Unlike the conventional arrangement, the spring, which is arranged within the cassette holder part to press and hold the cassette need not have a large pressing force. Besides, the cassette 2 is never damaged by virtue of the arrangement described.

The engagement between the engaging member 26 and the positioning hole 5a may be arranged to be effected in various manners: Before the insertion of the cassette 2, the engaging part 26c comes into the positioning hole 5a to a slight extent. With the cassette 2 inserted, the abutting part 22b of the rear holder 22 is pushed. Then, the engaging part 26c is completely engaged with the positioning hole 5a by virtue of the urging force of the spring 25. In another arrangement, the engaging part 26c is outside of the positioning hole 5a before insertion of the cassette 2. Then, the engaging part 26c is allowed to engage the positioning hole 5a when the cassette 2 is moved in the direction of arrow A by the loading action of the loading motor 37.

When the motor 37 begins to perform the loading action, each of the pins 21a moves in the direction of arrow A along the slot 62a and then moves in the direction of arrow K along the slot 62b. The pins 21a pierce the slots 30b and 31b of the guides 30 and 31 while the bent parts 21b provided on both sides of the rear half 21 are fitted into the slits or slots 30c and 31c of the guides 30 and 31. Therefore, the guides 30 and 31 do not move when the pins 21a moves in the direction of arrow A. Further, when the pins 21a move in the direction of arrow K, the rollers 35, which fittingly engage the slots 33a provided in the side chassis 33 and similar slots provided in the sub-chassis 34, prevent any rattling in the directions of arrows A and B to ensure smooth movement in the direction of arrow K. This enables the front holder part 10, which is secured to the guides 30 and 31, to move also in the direction of arrow K. In other words, the front holder part 10 is movable only in the directions of arrows J and K while the rear holder part 20 is movable not only in the directions of arrows J and K but is movable also in the directions of arrows A and B.

The reason for arranging the front holder part 10 to be not movable in the directions of arrows A and B is as follows: Before that, however, let us briefly describe the shutter opening and closing arrangement. Before the cassette 2 is inserted into the cassette holder part, the lock claw 4b engages a recess which is not shown but is provided in the shutter lock member 2d. The claw 4b thus prevents the shutter 4 from being opened. When the cassette 2 is manually inserted into the cassette holder part in the direction of arrow A, the closing claw 15c of the cassette closing member 15 and the opening claw of the cassette opening member 12 fittingly engage a groove 2c provided in one side face of the cassette 2 and slide along the groove 2c. Then, the closing claw 15c first engages the shutter lock member 2d at its tapered part 15c'. The closing member 15 then turns on the pin 12d against the force of the spring 16 in the direction of arrow F (FIG. 2). The closing claw 15c thus rides on the side face of the shutter 4. At this moment, the opening claw 12c is located before the shutter lock member 2d. When the cassette 2 is further pushed in, the closing claw 15c plunges into the shutter closing hole 4a. The opening claw 12a then pushes the lock member 2d to disengage the lock claw 4b from the above-stated recess. The shutter 4 is thus left there while the cassette 2 is further inserted in the direction of arrow A as the opening claw 12a then abuts on the side face 4c of the shutter 4. With the shutter 4 thus left behind, the stabilizer inserting window 4b and the magnetic head inserting window 2b' are exposed accordingly as the cassette 2 is further inserted.

In taking the cassette 2 out in the direction of arrow B, the closing claw 15c plunges into the shutter closing hole 4a to abut on the end face 4a' thereof. The shutter 4 thus comes to close the above-stated windows 2b and 2b' accordingly as the cassette 2 moves in the direction of arrow B. With the shutter 4 having completely closed, the lock claw 4b of the shutter 4 engages the above-stated recess of the shutter 4 lock member 2d. The shutter is thus locked. When the cassette 2 is further pulled out in the direction of arrow B under this condition, the closing member 15, which has its closing claw 15c abutting on the end face 4a' of the shutter closing hole 4a, comes to slide relative to the opening member 12 within the slot 15b. Then, the cam part 15e of the closing member 15 abuts on the bent part 12c of the opening member 12. This causes the closing member 15 to turn on the guide pin 12d in the direction of arrow F as indicated in FIG. 2. The closing claw 15c detaches from the hole 4a to allow the cassette 2 to come back to its state before the inserting operation.

The movement of the cassette 2 and the front holder part 10 relative to each other is as follows: The closing and opening members 15 and 12 for the shutter 4 are mounted on the front half 11 as mentioned in the foregoing. Therefore, if the front holder part 10 is arranged to move in the direction of arrow A together with the cassette 2 when the cassette 2 is inserted, the shutter opening claw 12a would move at the same speed as the cassette 2. Then, it would be impossible to open the shutter 4. Likewise, in case of unloading, the shutter opening claw 15c would move at the same speed as the cassette 2 in the direction of arrow B and then it would also be impossible to close the shutter 4. Whereas, arrangement to have the front holder part 10 move at a speed different from that of the cassette 2 makes it possible to open and close the shutter 4. However, this arrangement becomes complex. This embodiment solves this problem by arranging the front holder plate 10 immovable in the directions of arrows A and B. The arrangement permits simplification of structural arrangement and reduction in the cost of manufacture.

In loading the cassette 4 by rotating the motor 37, the gear train of FIG. 3A continues to turn even after the pins 21a have moved along the slot 62a. The pins 21a descend in the direction of K along the slots 62b and come to a stop at the lower edges of these slots 62b. Meanwhile, the gear train further turns. The motor stopping switch, which is not shown, then comes to operate when the spring 60 is completely charged. The motor 37 then comes to a stop. FIG. 3C shows this condition. The pins 21a are urged in the direction of arrow K by the urging forces of the springs 60. Therefore, the springs 19 and 29 urge the cassette 2 to move downward within the apparatus body 90. In the case of the conventional apparatus, a resilient spring is disposed in a position approximately corresponding to the springs 19 and 29 and the engaging part 26c of the engaging member 26. However, the conventional spring is arranged to cause a positioning member, which is arranged for the purpose of setting a datum plane, to have the reverse side of the cassette 2 come to abut thereon. Whereas in the case of this specific embodiment, no resilient spring is arranged in the neighborhood of the engaging part 26c. The cassette 2 is urged by an urging force of the spring 25 exerted on the engaging member 26 in the direction of arrow I without having any additional spring. Therefore, in accordance with the arrangement of this embodiment, the cassette 2 can be surely loaded without recourse to the pushing force of an additional resilient spring.

The cassette holder part of the embodiment described above is based on U.S. patent application Ser. NO. 777,229 by Uehara et al. entitled "Recording and/or Reproducing Apparatus", assigned to the same assignee and filed on the same data as the present application, now U.S. Pat. No. 4,736,357.

Since the cassette holder part is divided into the front and rear holder parts 10 and 20, the holder part can be assembled much easier than the conventional apparatus. More specifically, at the last stage of assembly work, the front holder part 10, excluding the guides 30 and 31, is first mounted in position as shown in FIG. 1; and, after that, the guides 30 and 31 and the front half 11 are mounted by means of screws through the facing screw holes 11c. Further, the arrangement to have the front holder part 10 immovable in the directions of arrows A and B enables the shutter opening and closing device, including the closing member 15, the opening member 12, etc., to be secured to the part 10, so that the shutter operating device can be simply arranged. Meanwhile, the arrangement for engaging and disengaging a record bearing medium container (cassette), which represent an important feature of this invention, is applicable not only to the apparatus having the above-stated loading device but also to an apparatus having a cassette holder part or a loading device of a different kind.

The operation of the stabilizer plate raising-and-lowering and center core pressing mechanism 70 during a cassette loading operation, is as follows: When there obtains the state of FIG. 3B, the loading motor 37 begins to operate as mentioned in the foregoing. The spur gear 50 is driven by the engagement of the gear train to turn counterclockwise. This causes the pin 50a and the roller 51 to turn. Then, after the state of FIG. 3B, the cam slot 52a of the lever 52 allows the lever 52 to turn clockwise on the shaft 54. With the lever 52 beginning to turn clockwise (see FIG. 3C), the stabilizer plate moving lever 53 which has been urged by the other end 56b of the spring 56 to move toward the lever 52 comes to turn counterclockwise on the shaft 73 as shown in FIG. 4A. Then, the pin 72a which is provided at the fore end of the lever 72 also turns counterclockwise.

The lever 76 is at first kept in the state of FIG. 4A. However, since the slot 76f of the lever 76 is in fitting engagement with the pin 72a, the lever 76 comes to turn round clockwise on the shaft 76 accordingly as the pin 72a moves in the direction of arrow K and also comes to descend in the direction of arrow K. The descent of the lever 76 causes the forked fore end part of the center core pressing member 79 to push the center core 3 of the magnetic disc 1 onto the spindle 92. The toggle spring 82 is arranged to have two stabilized positions including a first stable position as shown in FIG. 4A and a second stable position as shown in FIG. 4B. During the pressing operation of the center core pressing member 79, the toggle spring 82 is in the first stable position as long as the reaction of the center core 3 does not come to exceed a certain limit to keep the pressing member 79 in a position relative to the lever 81 as shown in FIG. 4A. When the reaction exceeds the above-stated limit, however, the toggle spring 82 shifts to the second position as shown in FIG. 4B. The pressing member 79 then turns relative to the lever 81 and escapes in a direction different from the above-stated pressing direction, for example, in a direction opposite to the pressing direction. FIG. 4B shows a loading completed state of the embodiment. The pressing member 79 stays away from the magnetic disc 1 during a recording or reproducing operation to impose no unnecessary load on the disc rotating motor 91. Thus, the center core 3 of the magnetic disc 1 is pressed and fitted on the spindle 92 without fail. In unloading the cassette 2, the pressing member 29, which is in the above-stated escaped position, turns counterclockwise together with this lever 76. During the counterclockwise motion, the member 79 comes into contact with the frame 71. The toggle spring 82 comes back to the first stable position. The pressing member 79 then comes to turn clockwise on the shaft 80 relative to the lever 81. The embodiment thus comes back to the state as shown in FIG. 4A.

Under the condition as shown in FIG. 4B, a switch, which is not shown, operates to bring the loading motor 37 to a stop. The disc rotating motor 91 and the stepping motor 66 (FIG. 1) begin to rotate. The magnetic disc 1 rotates. The driving force of the stepping motor 66 causes the magnetic head 94 to have access to a selected recording track on the magnetic disc 1. A recording or reproducing operation is performed. For this operation, the stabilizer plate 74 comes down to a position in which the plate 74 is either in contact with the rotary magnetic disc 1 or is opposed to the disc 1 across an air layer of a predetermined thickness, so that they can be kept in a desired contacting or confronting state. In this instance, the height of the stabilizer plate 74 relative to the disc 1 is adjustably defined by means of the screw 77 which is mounted on the lever 76 and is abutting on the fore end of the fixed shaft 91a of the motor 91.

Support means for supporting the stabilizer plate raising-and-lowering and center core pressing mechanism in the above embodiment, is based on U.S. patent application by Uehara et al. entitled "Recording and/or Reproducing Apparatus", assigned to the same assignee and filed on the same date as the present application. The center core pressing device including the pressing member 79 and the stabilizer plate 74 are mounted on a common lever 76. The pressing operation and the pressure releasing operation on the center core 3 and the vertical moving operation on the stabilizer plate are thus arranged to be accomplished both by the turning motion of the lever 76.

The arrangement permits unitized assembly work on these parts, so that assembly work on the whole apparatus can be simplified and rationalized. Further, since these parts are arranged to be mounted on the apparatus body via the frame 71, an assembly, which has been subjected to adjustment called head-touch adjustment made on the apparatus body, can be mounted as it is on the loading device. Further, a deviation of the center core pressing position due to a positional deviation resulting from an error in coupling work on the apparatus body and the loading device and variations in the pressing force, can be either eliminated or lessened.

The arrangement for engagement and disengagement of the record bearing medium container (cassette), which represents an important feature of this invention, is applicable not only to the apparatus described but also to an apparatus having support means for supporting the stabilizer plate raising-and-lowering and center core pressing mechanism arranged in a different manner.

Finally, the unloading operation of the apparatus described above is described as follows: The loading motor 37 comes to rotate in a direction reverse to the rotation for loading in response to an operation such as pushing an eject key or the like, which is not shown. The lever 76 then turns counterclockwise on the shaft 75. During the counterclockwise turning of the lever 76, the action of the toggle spring 82 brings the pressing member 79 back to its position relative to the lever 81 as shown in FIG. 4A. Meanwhile, the rear holder part 20 and the front holder part 10 move upward in the direction of arrow J as shown in FIGS. 1 and 3A. The rear holder part 20 then moves in the direction of arrow B to enable the cassette 2 to be taken out to the outside of the apparatus. When the rear holder part 20 comes back to the position of the disengaging member 28 shown in FIGS. 1 and 2, the member 28 causes the engaging member 26 to disengage from the positioning hole 5a. When the cassette 2 reaches a predetermined point, a switch, which is not shown, operates to bring the loading motor 37 to a stop. The unloading operation then comes to an end.

One example of an embodiment of this invention is as described above. The cassette 2 which has the shutter 4 can be advantageously handled by the embodiment, because: It is advantageous to utilize the positioning hole 5a disposed on the same side as the shutter 4 for engagement with the engaging member 26 provided on the rear holder 22 for the following reason: In pulling the cassette 2 which is provided with the shutter 4 into the front holder 18, the load on the pulling action is much larger on the side on which the shutter 4 is disposed than the other side of the cassette 2 as the shutter opening mechanism is arranged to act on the shutter 4. Then, if the pulling action is arranged to be performed either solely on the side where the shutter 4 is not disposed or on the middle part of the cassette 2, the cassette 2 would swivel to hinder a smooth performance of the pulling action. Whereas, the embodiment is arranged to have the pulling action on a point on the same side as the shutter 4 to obviate the possibility of such a trouble, so that the pulling action can be smoothly performed.

While a specific embodiment of the invention has been shown and described in detail to illustrate the application of the inventive principles, it will be understood that the invention may be embodied otherwise without departing from such principles. For example, the disengaging member 28 may be arranged in such a way as to control the engagement and disengagement of the engaging member 26 by detecting the position of the cassette 2 during its movement in the directions of arrows A and B.

What is claimed is:

1. A loading apparatus, for loading a record bearing medium container having a positioning hole for positioning said container in a predetermined loaded position, comprising:
- an engaging member arranged to engage with said positioning hole;
- urging means for urging said engaging member to engage said positioning hole;
- moving means for moving said engaging member, in a state in which said engaging member is engaged with said positioning hole, to load said container to said predetermined loaded position;
- a disengaging member arranged to disengage said engaging member from said positioning hole in said loaded position; and
- a positioning member for positioning said container at said loaded position by engaging with said positioning hole of said container.

2. The apparatus according to claim 1, wherein at least a part of, said engaging member engaging with said positioning hole is made of a plastic material.

3. The apparatus according to claim 1, wherein said urging means is composed of an elastic member which is arranged to urge said engaging member.

4. The apparatus according to claim 1, wherein the function of said urging means is arranged to be performed by said engaging member itself by making said engaging member with an elastic material.

5. In a recording and/or reproducing apparatus using a record bearing medium housed in a cassette which is provided with at least one positioning part for positioning said cassette at a predetermined loading position for recording and/or reproducing within said apparatus and pulling the cassette into the apparatus in loading, a cassette loading device comprising:
- (a) holding means for receiving and holding the cassette, said holding means being arranged to receive the cassette from a predetermined first direction and movable in a predetermined second direction different from said first direction to place the cassette at said predetermined loading position;
- (b) hooking means for hooking to pull the cassette into said holding means in said first direction, said hooking means having an engaging member engageable with the positioning part of the cassette and hooking the cassette at the positioning part thereof through said engaging member, said engaging member being urged to engage with the positioning part of the cassette;
- (c) control means responsive to the position of said engaging member for causing the engaging member to engage with and disengage from the positioning part of the cassette, said engaging member being arranged so as to be disengaged from the positioning part in a state where the cassette is loaded at said predetermined loading position; and
- (d) a positioning member for positioning said cassette at said loading position by engaging with said positioning part of said cassette.

6. The device according to claim 5, wherein the positioning part of the cassette is a through hole; and said engaging member of said hooking means is provided with a projected part which is engageable with the through hole of the cassette.

7. The device according to claim 5, wherein said engaging member has an elasticity.

8. The device according to claim 5, wherein said hooking means further has an urging member for urging said engaging member to engage with the positioning part of the cassette, said control means being arranged to disengage said against said urging member.

9. The device according to claim 5, wherein said hooking means is movable relative to said holding means in said first direction to pull the cassette into the holding means.

10. The device according to claim 5, wherein control means is arranged to enable said engaging member of said hooking means to engage with the positioning part of the cassette when the engaging member is moved to a predetermined position in said first direction.

11. The device according to claim 5, wherein said control means is arranged to disengage said engaging member from the positioning part of the cassette when the engaging member is placed at a predetermined position along said first direction.

12. The device according to claim 5, further comprising:
- drive means for driving said hooking means and said holding means so that the hooking means is firstly moved in said first direction to pull the cassette into the holding means and thereafter the holding means is moved in said second direction to place the cassette at said loading position.

13. In a recording and/or reproducing apparatus using a disc-shaped record bearing medium housing in a thin box-shaped cassette, said cassette being provided with a first side part and a second side part parallel to each other, a window disposed near said first side part to expose a portion of the medium, a cover movable along said first side part to close and open said window, and at least two positioning holes for positioning said cassette at a predetermined position for recording and/or reproducing within said apparatus, the first one of which is disposed near said first side part, and the cassette being insertable into the apparatus along a predetermined first direction parallel to said side parts and in which said cover is movable;
- a cassette loading device comprising:
- (a) opening means for moving said cover of the cassette to open the window when the cassette is inserted and pulled into the apparatus in said first direction;
- (b) hooking means for hooking to pull the cassette to a predetermined position within the apparatus in said first direction, said hooking means having an engaging member movable in said first direction to engage with said first one of the positioning holes of the cassette and hooking the cassette at said first positioning hole thereof through said engaging member;
- (c) control means for causing said engaging member to engage with and disengage from said first positioning hole of the cassette, said control means controlling engagement and disengagement of said engaging member in accordance with the position of said cassette said engaging member being arranged to be disengaged from the positioning holes in a state where the cassette is loaded at said predetermined position for recording and/or reproducing; and
- (d) a positioning member for positioning said cassette at said loading position by engaging with said positioning holes of said cassette.

14. The device according to claim 13, wherein said control means is arranged to enable said engaging member of said hooking means to engage with the first positioning hole of the cassette when the cassette is inserted into the apparatus to a predetermined position in said first direction.

15. The device according to claim 13, further comprising:

holding means for receiving and holding the cassette, said holding means being arranged to receive the cassette from said first direction and movable in a predetermined second direction substantially perpendicular to said first direction to place the cassette at a predetermined loading position, said opening means being arranged to move said cover of the cassette when the cassette is inserted and pulled into said holding, means; and said hooking means being arranged to pull the cassette into said holding means.

16. The device according to claim 15, wherein said hooking means is movable relative to said holding means in said first direction to pull the cassette into the holding means.

17. The device according to claim 15, further comprising:

drive means for driving said hooking means and said holding means so that the hooking means is firstly moved in said first direction to pull the cassette into the holding means and thereafter the holding means is moved in said second direction to place the cassette at said loading position.

18. A recording and/or reproducing apparatus using a record bearing medium housed in a cassette which is provided with at least one positioning part for positioning the cassette within the apparatus in loading, said apparatus comprising:

(a) holding means for receiving and holding the cassette, said holding means being arranged to receive the cassette from a predetermined first direction and movable in a predetermined second direction different from said first direction to place the cassette at a predetermined loading position;

(b) positioning means engageable with the positioning part of the cassette to position the cassette at said loading position;

(c) recording and/or reproducing means for recording signals on and/or reproducing recorded signals from the medium in a condition that the cassette is positioned at said loading position;

(d) hooking means for hooking to pull the cassette into said holding means in said first direction, said hooking means having an engaging member movable in said first direction to engage with the positioning part of the cassette and hooking the cassette at the positioning part thereof through said engaging member; and (e) control means responsive to said engaging member for causing the engaging member to engage with and disengage from the positioning part of the cassette, said engaging member being arranged so as to be disengaged from the positioning part in a condition where the cassette is loaded at said predetermined loading position by said holding means.

19. A recording and/or reproducing apparatus using a disc-shaped record bearing medium housing in a thin box-shaped cassette, said cassette being provided with a first side part and a second side part parallel to each other, a window disposed near said first side part to expose a portion of the medium, a cover movable along said first side part to close and open said window, and at least two positioning holes for positioning said cassette within said apparatus, the first one of which is disposed near said first side part, and the cassette being insertable into the apparatus along a predetermined first direction parallel to said side parts and in which said cover is movable;

said apparatus comprising:

(a) a cassette holder for receiving and holding the cassette, said holder being arranged to receive the cassette from said first direction and movable in a predetermined second direction substantially perpendicular to said first direction to place the cassette at a predetermined loading position;

(b) positioning pins respectively engageable with the positioning holes of the cassette to position the cassette at said loading position;

(c) opening means for moving said cover of the cassette to open the window when the cassette is inserted and pulled into said holder in said first direction;

(d) a head for recording signals on and/or reproducing recorded signals from the medium, said head being arranged to confront a recording surface of the medium through the open window of the cassette when the cassette is placed at said loading position;

(e) rotating means for rotating the medium relative to said head, said rotating means being engageable with a portion of the medium when the cassette is placed at said loading position;

(f) hooking means for hooking to pull the cassette into said holder in said first direction, said hooking means having an engaging member movable in said first direction to engage with said first one of the positioning holes of the cassette and hooking the cassette at said first positioning hole thereof through said engaging member, said hooking means further having an urging member for urging said engaging member to engage with said first positioning hole of the cassette; and (g) disengaging means for disengaging said engaging member of said hooking means from said first positioning hole of the cassette against said urging member, said disengaging means releasing said engaging member in accordance with the position of said cassette, said engaging member being arranged so as to be disengaged from the positioning hole in a condition wherein the cassette is loaded at said predetermined loading position by said cassette holder and is positioned at said predetermined loading position by said positioning pins.

* * * * *